US011420567B2

United States Patent
Nageshkar et al.

(10) Patent No.: US 11,420,567 B2
(45) Date of Patent: Aug. 23, 2022

(54) SEAT ASSEMBLY HAVING INTERCHANGEABLE CARTRIDGE ASSEMBLIES FOR ADJUSTABLE COMFORT SETTINGS

(71) Applicant: Ford Global Technologies, LLC, Dearborn, MI (US)

(72) Inventors: Vishal Vinayak Nageshkar, Farmington Hills, MI (US); Sangram Tamhankar, Canton, MI (US); Christian J. Hosbach, Pittsburgh, PA (US); Patrick Maloney, Livonia, MI (US); Alex Perkins, Detroit, MI (US); Victoria Leigh Schein, Dearborn, MI (US); Kevin VanNieulande, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 405 days.

(21) Appl. No.: 16/715,253

(22) Filed: Dec. 16, 2019

(65) Prior Publication Data

US 2021/0178976 A1 Jun. 17, 2021

(51) Int. Cl.
*B60R 7/08* (2006.01)
*B60R 11/00* (2006.01)

(52) U.S. Cl.
CPC .......... *B60R 7/08* (2013.01); *B60R 2011/0015* (2013.01); *B60R 2011/0043* (2013.01); *B60R 2011/0082* (2013.01)

(58) Field of Classification Search
CPC ....................................................... B60R 7/08

USPC .......................... 297/452.57, 452.37, 452.27
See application file for complete search history.

(56) References Cited

U.S. PATENT DOCUMENTS

| 4,065,182 A | 12/1977 | Braniff et al. |
| 4,079,994 A | 3/1978 | Kehl |
| 4,603,907 A * | 8/1986 | Witzke ..................... B60N 2/58 297/DIG. 2 |
| 4,702,522 A * | 10/1987 | Vail .......................... 297/452.56 |

(Continued)

FOREIGN PATENT DOCUMENTS

| DE | 102013218223 A1 | 2/2015 |
| DE | 102018119660 A1 | 2/2019 |

*Primary Examiner* — Anthony D Barfield
(74) *Attorney, Agent, or Firm* — Vichit Chea; Price Heneveld LLP (57) ABSTRACT

A seat assembly includes a seatback having a cushioned component pivotally coupled to the seatback and operable between deployed and retracted positions. The cushioned component includes an interior cavity. A rack assembly is positioned within the interior cavity and includes a forward-most rack with a first receiving area. The rack assembly further includes a rearward-most rack having a second receiving area. A first cartridge assembly is removeably received in the first receiving area of the rack assembly. A second cartridge assembly is removeably received in the second receiving area of the rack assembly. The rack assembly may also include one or more intermediate rack assemblies positioned between the forward-most and rearward-most rack assemblies for supporting other intermediate cartridge assemblies. Each cartridge assembly includes a different density profile for providing variated comfort settings to the seatback of the seat assembly.

16 Claims, 5 Drawing Sheets

(56) References Cited

U.S. PATENT DOCUMENTS

| | | | | |
|---|---|---|---|---|
| 5,894,664 A * | 4/1999 | Bullard | .................... | A47C 7/28 |
| | | | | 29/451 |
| 6,152,534 A * | 11/2000 | Maeda | ..................... | 297/452.59 |
| 6,375,269 B1 * | 4/2002 | Maeda | ..................... | B60N 2/72 |
| | | | | 297/452.59 |
| 7,377,589 B1 | 5/2008 | Glater | | |
| 8,220,873 B2 * | 7/2012 | Kemp | ..................... | A61G 7/05 |
| | | | | 5/653 |
| 9,694,755 B2 | 7/2017 | Gawade et al. | | |
| 10,343,565 B2 | 7/2019 | Baek et al. | | |
| 10,357,955 B2 | 7/2019 | Ziolek | | |

\* cited by examiner

SEAT ASSEMBLY HAVING INTERCHANGEABLE CARTRIDGE ASSEMBLIES FOR ADJUSTABLE COMFORT SETTINGS

FIELD OF THE INVENTION

The present invention generally relates to a seat assembly, and more particularly, to a seat assembly having interchangeable cartridge assemblies with unique density profiles to provide an adjustable comfort setting for the seat assembly.

BACKGROUND OF THE INVENTION

Adjustable comfort settings for a seat assembly are desired. A rack assembly with interchangeable cartridges having unique density profiles provides users an adjustable comfort setting for a seat assembly.

SUMMARY OF THE INVENTION

According to one aspect of the present invention, a seat assembly includes a cushioned component having an interior cavity. A rack assembly is positioned within the interior cavity. The rack assembly includes a plurality of racks disposed therein. Each rack of the plurality of racks includes opposed first and second mounting members spaced-apart from one another to define a receiving area therebetween. A plurality of cartridge assemblies are removeably received on the rack assembly. Each cartridge assembly of the plurality of cartridge assemblies includes a cushioned portion including first and second attachment interfaces disposed on opposite sides of the cushioned portion. The first and second attachment interfaces of each cartridge assembly of the plurality of cartridge assemblies are slideably received in a corresponding rack of the plurality of racks of the rack assembly along the opposed first and second mounting members.

According to another aspect of the present invention, a seat assembly includes a cushioned component with an interior cavity. A rack assembly is positioned within the interior cavity. The rack assembly includes first and second mounting members spaced-apart from one another to define a receiving area therebetween. A cartridge assembly includes first and second attachment interfaces spaced-apart from one another and interconnected by a cushioned portion. The cartridge assembly is removeably received within the receiving area.

According to yet another aspect of the present invention, a seat assembly includes a seatback having a cushioned component pivotally coupled to the seatback and operable between deployed and retracted positions. The cushioned component includes an interior cavity. A rack assembly is positioned within the interior cavity and includes a forward-most rack with a first receiving area. The rack assembly further includes a rearward-most rack having a second receiving area. A first cartridge assembly is removeably received in the first receiving area of the rack assembly. A second cartridge assembly is removeably received in the second receiving area of the rack assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figures 1, 2:
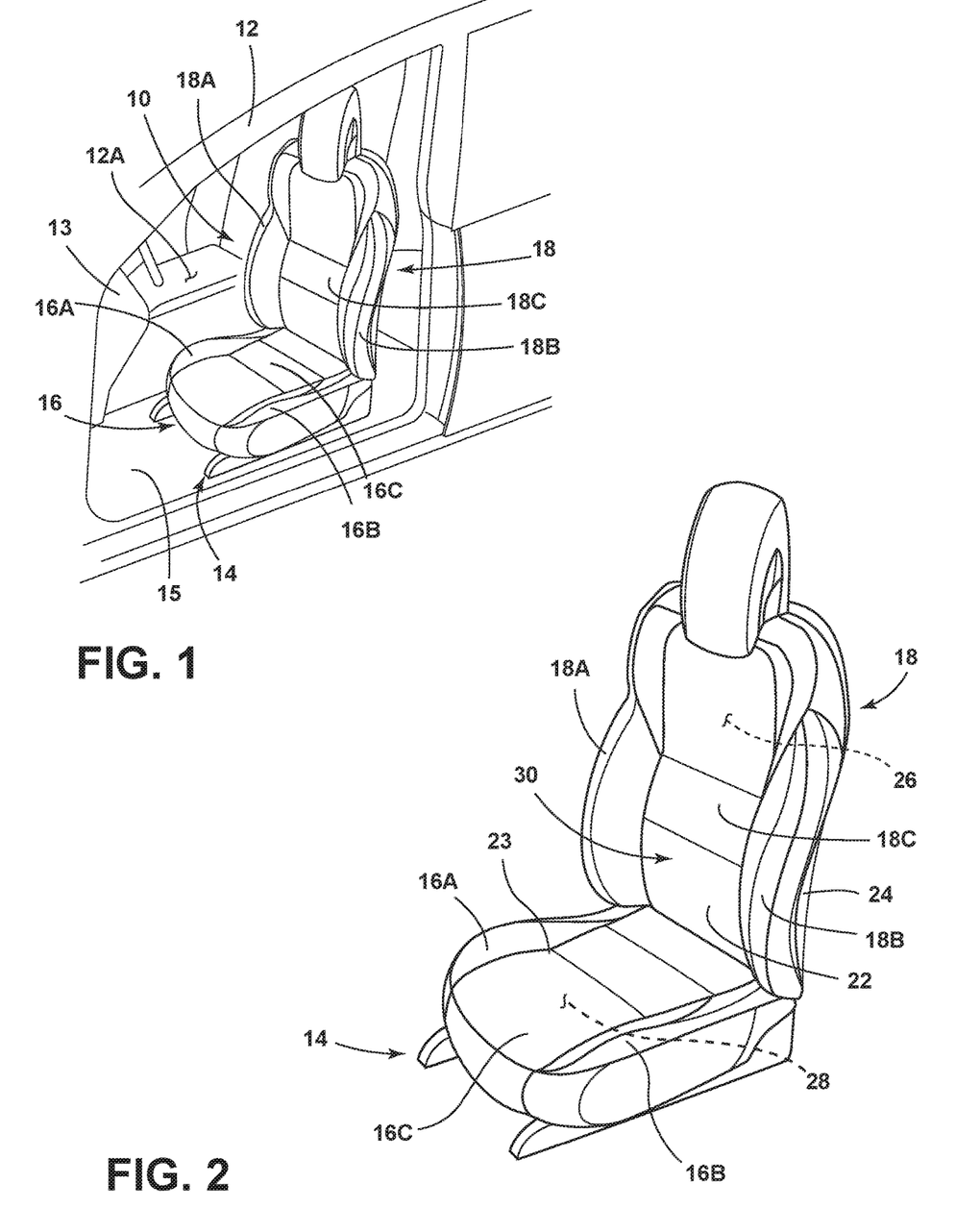
FIG. 1 is a top perspective view of a seat assembly positioned within a car interior.
FIG. 2 is a top perspective view of the seat assembly of FIG. 1 as removed from the vehicle interior and showing a cushioned component in a retracted position.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed in other seat assemblies positioned in other areas of a vehicle interior 12A, such as the passenger side seating area, a rear seating area, or a third row seating option. The seat assembly 10 is supported on a track system 14 disposed on a vehicle floor support surface 15, and generally includes a substantially horizontal seat portion 16 and a substantially upright seatback 18. It is contemplated that the seatback 18 is a pivoting member configured for pivotal movement relative to the seat portion 16. The seat portion 16 generally includes a central support portion 16C having protruding fins or side bolsters 16A, 16B disposed on opposite sides thereof. The side bolsters 16A, 16B are separated or spaced-apart from one another by the central support portion 16C and are generally disposed at an inward angle directed towards the central support portion 16C. The side bolsters 16A, 16B are configured to provide support for a vehicle occupant as seated in the seat assembly 10 when the vehicle 12 is in motion. Similarly, the seatback 18 includes side bolsters 18A, 18B and a central support portion 18C. The side bolsters 18A, 18B are generally angled towards the central support portion 18C of the seatback 18.

As further shown in FIG. 2, the various parts of the seat portion 16 and the seatback assembly 18 are covered with seat covers 23, 22, respectively. The seat covers 23, 22 may be comprised of a suitable natural or synthetic material, such as leather, imitation leather, vinyl, clothe, or any combination thereof, that generally covers the cushion materials and frame components of the seat assembly 10. As shown in FIG. 2, the seatback 18 includes a close-out rear panel 24. Together, the rear panel 24 and the seat cover 22 surround an interior 26 of the seatback 18. The seatback 18 further includes a cushioned component 30 disposed in a retracted position, wherein the cushioned component 30 partially defines the central support portion 18C of the seatback 18. In FIG. 2, the seat cover 23 of the seat portion 16 covers and conceals an interior 28 of the seat portion 16.

Figure 3A:
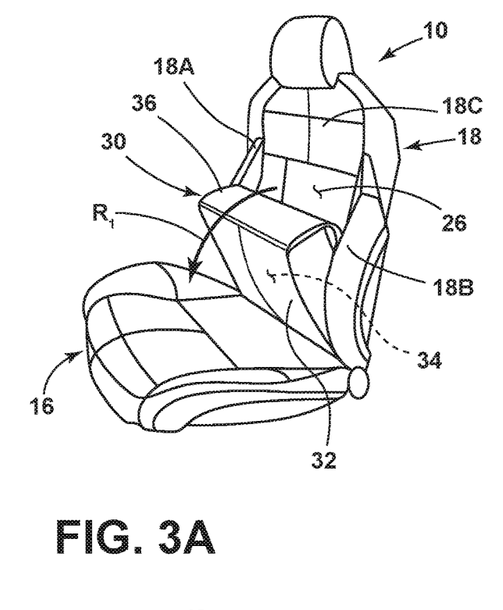
FIG. 3A is a top perspective view of the seat assembly of FIG. 1 illustrating relative movement of the cushioned component towards a deployed position.

Referring now to FIG. 3A, the seat assembly 10 is shown having the cushioned component 30 disposed in a deployed position. As such, the cushioned component 30 of the seatback 18 is pivotally coupled to the seatback 18 and operable between deployed and retracted positions, as shown in FIGS. 3A and 2, respectively. The cushioned component 30 moves from the retracted position (FIG. 2) to the deployed position (FIG. 3A) by pivoting an upper portion of the cushioned component 30 in a forward direction as indicated by arrow $R_1$. The cushioned component 30 includes an interior cavity 34 surrounded by a cover 32. The cover 32 may include any type of material similar to the seat cover 22 of the seatback 18 described above. The cover 32 includes a flap 36 that is operable between open and closed positions to selectively provide access to an open top portion of the cushioned component 30 that opens into the interior cavity 34 of the cushioned component 30. The flap 36 in the embodiment of FIG. 3A is accessible when the cushioned component 30 is pivoted to the deployed position. It is contemplated that the cushioned component 30 is pivotally coupled to a supporting frame assembly of the seatback 18 in assembly.

Figure 3B:
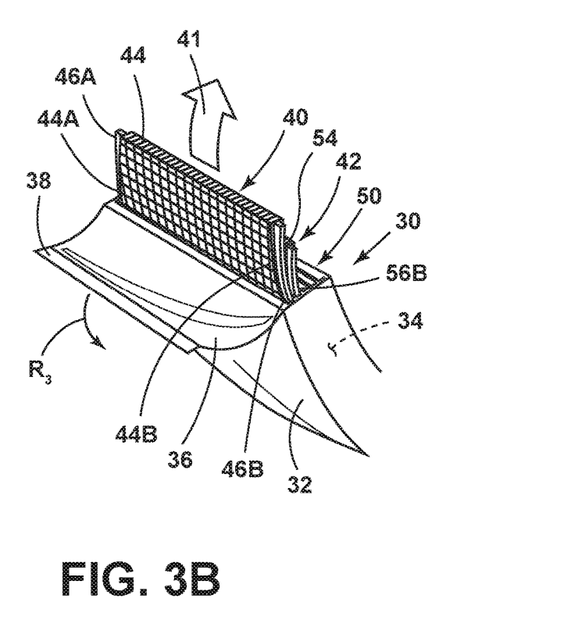
FIG. 3B is a top perspective view of the cushioned component of FIG. 3A as removed from the seat assembly and illustrating relative movement of multiple cartridge assemblies being removed from an interior cavity of the cushioned component.

Referring now to FIG. 3B, the flap 36 of the cushioned component 30 is accessible, as the cushioned component 30 is disposed in a deployed position. The flap 36 can be opened by moving the flap 36 in the direction as indicated by arrow $R_3$ to selectively provide access to the interior cavity 34 of the cushioned component 30. As such, the flap 36 is an articulating flap that moves between the open and closed positions. The flap 36 includes an end portion 38 that may include a first part of a 2-part hook and loop fastener device to fasten the flap 36 to the cover 32 when the flap 36 is in the closed position. As shown in FIG. 3B, first and second cartridge assemblies 40, 42 define a plurality of cartridge assemblies that are removeably received on a rack assembly 50 disposed within the interior cavity 34 of the cushioned component 30. The first cartridge assembly 40 includes a cushioned portion 44 having first and second attachment interfaces 46A, 46B disposed on opposite first and second sides 44A, 44B of the cushioned portion 44. The first and second attachment interfaces 46A, 46B of the first cartridge assembly 40 are slideably received in a corresponding rack of the rack assembly 50, as further described below.

Figure 3C:
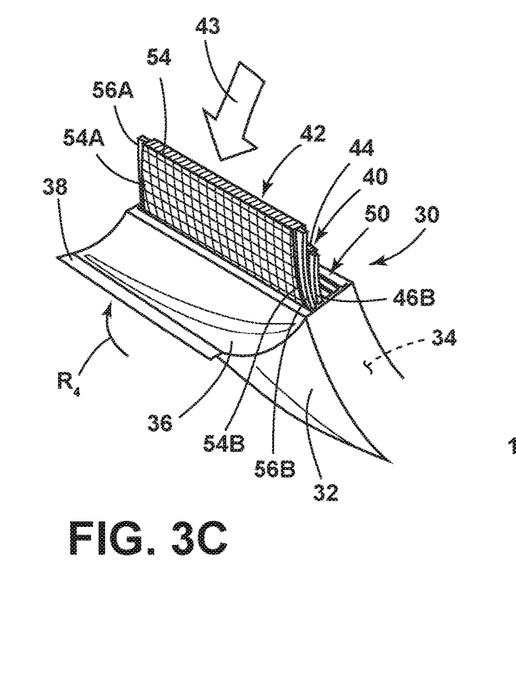
FIG. 3C is a top perspective view of the cushioned component of FIG. 3B illustrating relative movement of the multiple cartridge assemblies of FIG. 3B being inserted into the interior cavity of the cushioned component in a different order as compared to FIG. 3B.

With the flap 36 in the open position, the first and second cartridge assemblies 40, 42 can be removed from the rack assembly 50 of the cushioned component 30 by pulling the first and second cartridge assemblies 40, 42 out of the interior cavity 34 of the cushioned component 30 along the path as indicated by arrow 41. With reference to FIG. 3C, the second cartridge assembly 40 is shown as having a first and second attachment interfaces 56A, 56B spaced-apart from one another and interconnected by a cushioned portion 54 disposed therebetween. Thus, like the first cartridge assembly 40, the second cartridge assembly is configured with the cushioned portion 54 having the first and second attachment interfaces 56A, 56B disposed on opposite first and second sides 54A, 54B of the cushioned portion 44. As similarly configured, the first cartridge assembly 40 and the second cartridge assembly 42 are interchangeable on the rack assembly 50. In FIG. 3B, the first cartridge assembly 40 is shown disposed in front of the second cartridge assembly 42. When the seatback 18 is packaged with the first cartridge assembly 40 disposed in the forward-most position of the rack assembly 50, the first cartridge assembly 40 defines a support interface for the seat assembly 10 at the central support portion 18C of the seatback 18. This is due to the positioning of the first cartridge assembly 40 on the rack assembly 50, in that a seat occupant will engage the first cartridge assembly 40 when seated in the seat assembly 10. Thus, with the first cartridge assembly 40 disposed in the forward-most position of the rack assembly 50, the seat assembly 10 provides a first comfort setting.

In FIG. 3B, the first and second cartridge assemblies 40, 42 are illustrated as being removed along the path indicated by arrow 41 from the rack assembly 50. In FIG. 3C, the first and second cartridge assemblies 40, 42 are being reinserted into the rack assembly 50 along the path as indicated by arrow 43. However, in FIG. 3C, the second cartridge assembly 42 is shown as being inserted into the forward-most position of the rack assembly 50. Thus, the position of the first and second carriage assemblies 40, 42 has been reversed on the rack assembly 50 from FIG. 3B to FIG. 3C. With the second cartridge assembly 42 positioned in the forward-most position of the rack assembly 50, the seat assembly 10 provides a second comfort setting that is different than the first comfort setting shown in FIG. 3B, as further described below. Once the first and second carriage assemblies 40, 42 are reinserted into the rack assembly 50, the flap 36 can be closed along the path as indicated by arrow $R_4$ to close the interior cavity 34 of the cushioned component 30

Figure 3D:
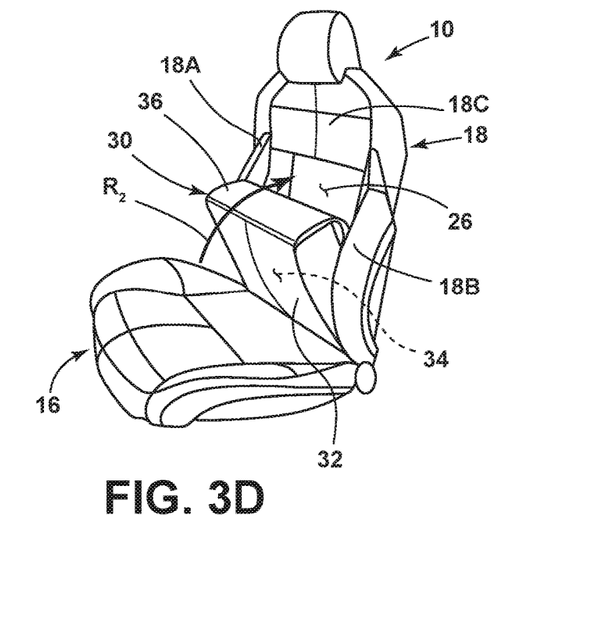
FIG. 3D is a top perspective view of the seat assembly of FIG. 3A illustrating relative movement of the cushioned component towards the retracted position.

With reference to FIG. 3D, the cushioned component 30 is being moved or pivoted from the deployed position towards the retracted position along the path as indicated by arrow $R_2$. Thus, FIG. 2 shows the seat assembly 10 with the cushioned component 30 in the retracted position along the centrally disposed support portion 18C of the seatback 18. It is contemplated that FIG. 2 illustrates the seat assembly 10 in any one of the comfort settings described herein. Thus, from FIG. 2 to FIG. 3A, the cushioned component 30 of the seat assembly 10 has been moved from the retracted position (FIG. 2) to the deployed position (FIG. 3A). It is further contemplated that the seat assembly 10 is in the first comfort setting in FIG. 3A, wherein the first cartridge assembly 40 is positioned in the forward-most position on the rack assembly 50. In FIG. 3B, the flap 36 is opened to reveal that the first cartridge assembly 40 is positioned in the forward-most position on the rack assembly 50, with the second cartridge assembly 42 positioned behind the first cartridge assembly 40. As noted above, when positioned in the forward-most position on the rack assembly 50, the first cartridge assembly 40 defines a support interface for the seat assembly 10 at the central support portion 18C of the seatback 18 to provide the first comfort setting of the seat assembly 10. From FIG. 3B to FIG. 3C, the first and second cartridge assemblies 40, 42 are removed from the rack assembly 50 along the path as indicated by arrow 41 (FIG. 3B), and are then reinserted into the rack assembly 50 along the path as indicated by arrow 43 (FIG. 3C) with the second cartridge assembly 42 positioned in the forward-most position on the rack assembly 50, with the first cartridge assembly 40 positioned behind the second cartridge assembly 42. Thus, the second cartridge assembly 42 now defines the support interface for the seat assembly 10 at the central support portion 18C of the seatback 18 to provide the second comfort setting of the seat assembly 10. Thus, the first and second cartridge assemblies 40, 42 are interchangeable along the rack assembly 50 to provide various comfort settings for the seat assembly 10. It is further contemplated that the seat assembly 10 may include more than two cartridge assemblies supported on the rack assembly 50 to provide more comfort settings for the seat assembly 10, as further described below with reference to FIGS. 4 and 5.

As used herein, the term "comfort setting" is used to describe a condition of the seat that relates to a deflection characteristic or density profile of a particular cartridge assembly that is positioned in the forward-most position on the rack assembly 50 to thereby define the support interface of the seat assembly 10 for a seat occupant.

Figure 4:
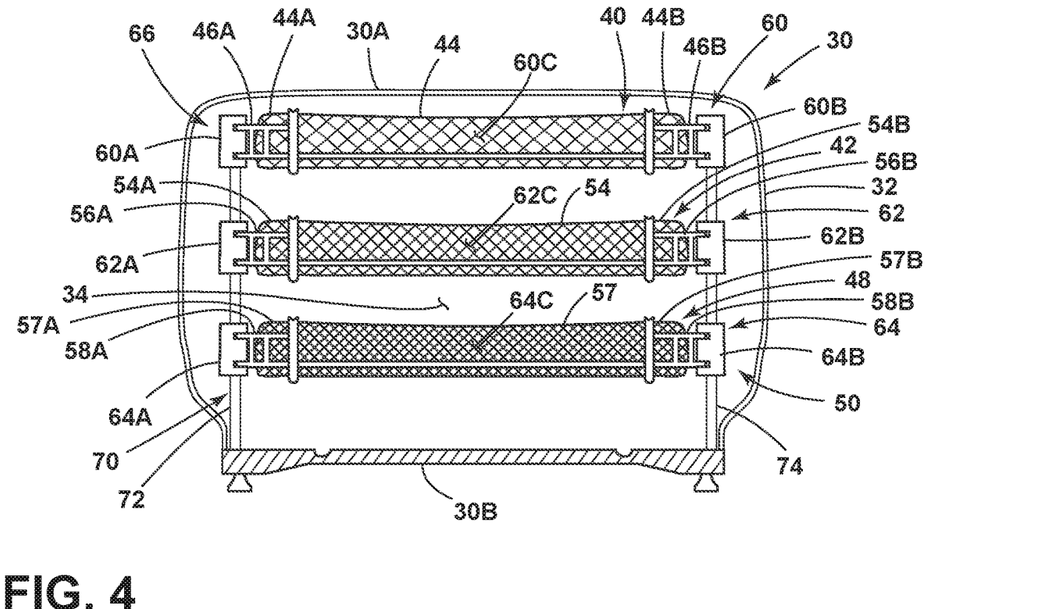
FIG. 4 is a top plan view of a cushioned component having a rack assembly disposed in an interior cavity thereof with multiple cartridge assemblies supported on the rack assembly.

Referring now to FIG. 4, the cushioned component 30 is shown having the rack assembly 50 disposed within the interior cavity 34 thereof. The rack assembly 50 includes a frame assembly 70 having first and second frame members 72, 74 that are spaced-apart from one another. As shown in FIG. 4, the first and second frame members 72, 74 generally extend between a front portion 30A and a rear portion 30B of the cushioned component 30 within the interior cavity 34. Mounted on the first and second frame members 72, 74, the rack assembly 50 includes a plurality of racks 66 comprised of racks 60, 62 and 64. Each rack 60, 62 and 64 of the plurality of racks 66 includes opposed first and second mounting members which are spaced-apart from one another to define receiving area therebetween. Specifically, rack 60 includes first and second mounting members 60A, 60B that are mounted to the respective first and second frame members 72, 74 of the frame assembly 70 and spaced-apart from one another to define a receiving area 60C therebetween. Further, rack 62 includes first and second mounting members 62A, 62B that are mounted to the respective first and second frame members 72, 74 of the frame assembly 70 and spaced-apart from one another to define a receiving area 62C therebetween. Finally, rack 64 includes first and second mounting members 64A, 64B that are mounted to the respective first and second frame members 72, 74 of the frame assembly 70 and spaced-apart from one another to define a receiving area 64C therebetween.

As further shown in FIG. 4, first cartridge assembly 40 is shown received in the receiving area 60C of rack 60 of the rack assembly 50. With rack 60 positioned along the front portion 30A of the cushioned component 30, rack 60 defines the forward-most position of the rack assembly 50. With the first cartridge assembly 40 disposed in the forward-most position of the rack assembly 50 (i.e. rack 60), the first cartridge assembly 40 defines the support interface for the seat assembly 10 (FIG. 2) at the central support portion 18C of the seatback 18. As described above, with the first cartridge assembly 40 disposed in the forward-most position of the rack assembly 50 (i.e. rack 60), the first cartridge assembly 40 provides a first comfort setting for the seat assembly 10 (FIGS. 2 and 3). Racks 62 and 64 are disposed behind rack 60 as viewed from the front portion 30A to the rear portion 30B of the cushioned component 30. In this way, racks 62 and 64 are provided as storage racks of the rack assembly 50 which, in FIG. 4, support cartridge assemblies provided as options for interchangeable movement to the forward-most position of the rack assembly 50 (i.e. rack 60). Specifically, the second cartridge assembly 42 is shown received in the receiving area 62C of rack 62 of the rack assembly 50. Further, a third cartridge assembly 48 is shown received in the receiving area 64C of rack 64 of the rack assembly 50. The first and second and third cartridge assemblies 40, 42 and 48 are all contemplated to have different density profiles, such that the various cartridge assemblies 40, 42 and 48 and provide varying comfort settings for the seat assembly 10 (FIG. 2).

With further reference to FIG. 4, the first cartridge assembly 40 includes the cushioned portion 44 with first and second attachment interfaces 46A, 46B disposed on opposite first and second sides 44A, 44B of the cushioned portion 44, as noted above. The first and second attachment interfaces 46A, 46B of the first cartridge assembly 40 are slideably received in the corresponding rack 60 of the rack assembly 50. Specifically, the first and second attachment interfaces 46A, 46B of the first cartridge assembly 40 are slideably received in the opposed first and second mounting members 60A, 60B, respectively, of the rack 60 of the rack assembly 50. Similarly, the second cartridge assembly 42 includes the cushioned portion 54 with first and second attachment interfaces 56A, 56B disposed on opposite first and second sides 54A, 54B of the cushioned portion 54, as noted above. The first and second attachment interfaces 56A, 56B of the second cartridge assembly 42 are slideably received in the corresponding rack 62 of the rack assembly 50. Specifically, the first and second attachment interfaces 56A, 56B of the second cartridge assembly 42 are slideably received in the opposed first and second mounting members 62A, 62B, respectively, of the rack 62 of the rack assembly 50. Further, the third cartridge assembly 48 includes a cushioned portion 57 with first and second attachment interfaces 58A, 58B disposed on opposite first and second sides 57A, 57B of the cushioned portion 57. The first and second attachment interfaces 58A, 58B of the third cartridge assembly 48 are slideably received in the corresponding rack 64 of the rack assembly 50. Specifically, the first and second attachment interfaces 58A, 58B of the third cartridge assembly 48 are removeably received in the opposed first and second mounting members 64A, 64B, respectively, of the rack 64 of the rack assembly 50. As slideably received and supported on the rack assembly 50, the first, second and third cartridge assemblies 40, 42 and 48 are interchangeable with regards to positioning on the rack assembly 50.

Figure 5:
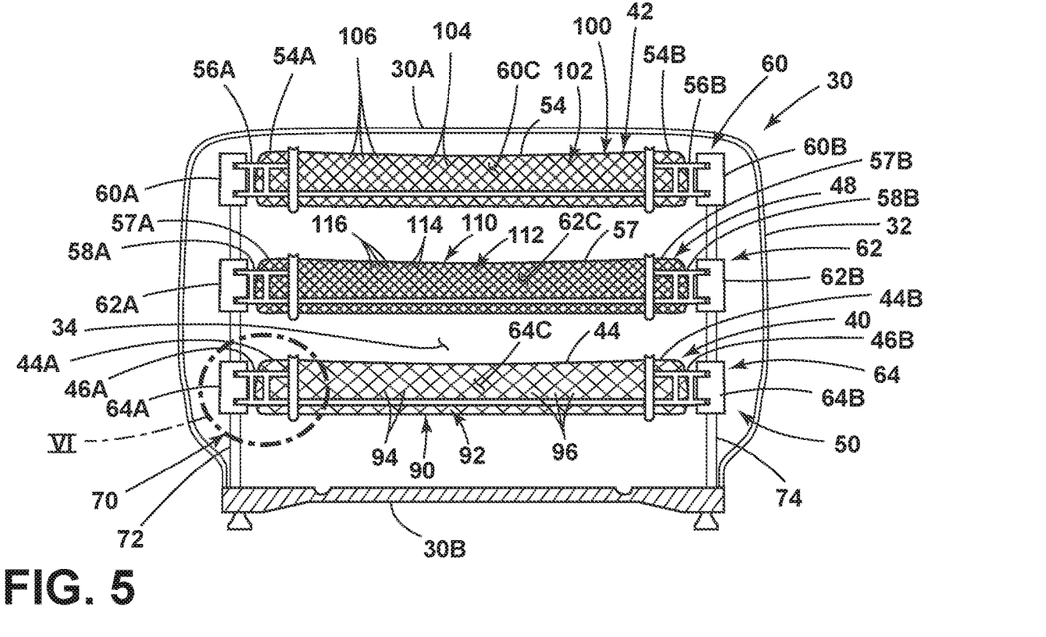
FIG. 5 is a top plan view of the cushioned component of FIG. 4 showing the multiple cartridge assemblies supported on the rack assembly in a different order as compared to FIG. 4.

Referring now to FIG. 5, the first, second and third cartridge assemblies 40, 42 and 48 have been rearranged along the rack assembly 50, such that the second cartridge assembly 42 is now in the forward-most position on the rack assembly 50 at rack 60. In this way, the second cartridge assembly 42 provides a second comfort setting for the seat assembly 10 (FIG. 2) that is different than the first comfort setting shown in FIG. 4. In rearranging the first, second and third cartridge assemblies 40, 42 and 48, the first cartridge assembly 40 has been moved to the rearward-most rack 64, and the third cartridge assembly 48 has been moved to the intermediate rack 62. In order to provide the second comfort setting of the seat assembly 10 shown in FIG. 5, it is also contemplated that a user could have moved the first cartridge assembly 40 to the intermediate rack 62, and moved to the second cartridge assembly 42 to the forward-most rack 60, as all cartridge assemblies 40, 42 and 48 are interchangeably supported on the racks 60, 62 and 64 of the rack assembly 50.

The racks 60, 62 and 64 of the rack assembly 50 may be described herein as first, second and third racks 60, 62 and 64. Rack 60 may be described as a first rack, a front rack or a forward-most rack of the rack assembly 50. Rack 64 may be described as a third rack, a rear rack or a rearward-most rack of the rack assembly 50. Rack 62 may be described as an intermediate rack position between rack 60 and 64 along the frame assembly 70. While given the above described descriptions of the racks 60, 62 and 64 of the rack assembly 50, it is contemplated that the present concept may include more racks or fewer racks on the rack assembly 50 than shown in the exemplary embodiments of FIGS. 4 and 5. For example, multiple intermediate racks may be positioned between the forward-most rack 60 and the rearward-most rack 64 on the rack assembly 50.

Figure 6:
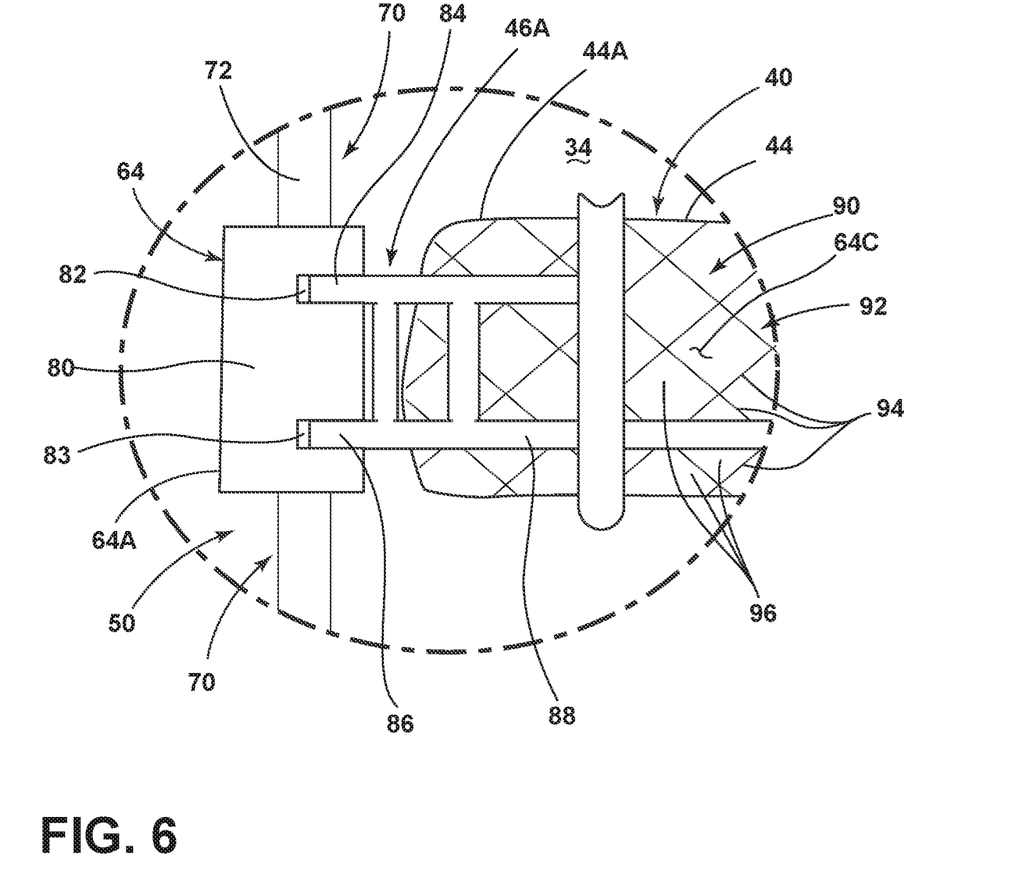
FIG. 6 is a close up view of the rack assembly and cartridge assembly of FIG. 5 taken at location VI.

Referring now to FIG. 6, the interconnection between the rack assembly 50 and the first cartridge assembly 40 is shown in greater detail and contemplated to provide support for the interconnection of the second and third cartridge assemblies 42, 48 on all racks 60, 62 and 64 of the rack assembly 50. Thus, the single side description of the interconnection between the rack assembly 50 and the first cartridge assembly 40 will provide adequate description of the interconnection means of the present concept for the mounting members of all racks disclosed herein and the attachment interfaces of all cartridge assemblies disclosed herein. As specifically shown in FIG. 6, the rack 64 of the rack assembly 50 includes the first mounting member 64A coupled to the first frame member 72 of the frame assembly 70 of the rack assembly 50. The first mounting member 64A includes a body portion 80 having first and second channels 82, 83 disposed therethrough. The first and second channels 82, 83 are inwardly opening channels that open towards the receiving area 64C defined between the first and second opposed mounting members 64A, 64B (FIGS. 4 and 5). Thus, the mounting members 64A, 64B of rack 64 are opposed mounting members in that the respective channels, such as first and second channels 82, 83 of mounting member 64A shown in FIG. 6, of the mounting members 64A, 64B of rack 64 open inwardly towards one another and towards the receiving area 64C disposed therebetween. Along the first side 44A of the cushioned portion 44 of the first cartridge assembly 40, the attachment interface 46A is shown having outwardly extending first and second rails 84, 86. The first and second outwardly extending rails 84, 86 outwardly extend from the cushioned portion 44 of the first cartridge assembly 40 at the first side 44A thereof. In FIG. 6, the first and second outwardly extending rails 84, 86 are shown as being slideably received in the respective inwardly opening channels 82, 83 of the first mounting member 64A of rack 64. As shown in FIGS. 4 and 5, the racks 60, 62 and 64 of the rack assembly 50 all include opposed first and second mounting members (60A, 60B; 62A, 62B; and 64A, 64B) with inwardly opening channels. In this way, the opposed attachment interfaces (46A, 46B; 56A, 56B; and 58A, 58B) of the various cartridge assemblies (40, 42 and 48) can be removeably received in the various receiving areas (60C, 62C, 64C) of the racks 60, 62 and 64 of the rack assembly 50. As used herein, the term "removeably received" indicates that a cartridge assembly can be received and removed from engagement with an associated rack, and can further be received and removed from any other rack disposed on the rack assembly 50 of the present concept to define a uniquely adjustable comfort setting for a seat occupant. As further shown in FIG. 6, the attachment interface 46A of the first cartridge assembly 40 may include an internal frame 88 disposed within the cushioned portion 44 of the first cartridge assembly 40. In this way, the internal frame 88 can provide extended support for the opposed attachment interfaces 46A, 46B of the first cartridge assembly 40 through the cushioned portion 44.

As used herein, the term "lattice matrix" refers to a structural pattern of interconnected links that define cells or voids therebetween, wherein the overall pattern resembles an expanded material configuration. The cartridge assemblies discussed herein are contemplated to be comprised of a single material used in an additive manufacturing process to form the individual cartridge assemblies into monolithic structures. In this way, the cartridge assemblies of the present concept include fully integrated component parts comprised of a common material that define overall monolithic structures. As used herein, the term "integrated" refers to component parts of a unitary whole that are formed together to provide the monolithic structure of the overall article. As used herein, the term "monolithic structure" is used to describe a structure that is formed of a single or common material provided in a forming process, such as an additive manufacturing technique. Additive manufacturing techniques contemplated for use with the present concept may include 3D printing, laser sintering and other known additive manufacturing techniques. Further, the cartridge assemblies of the present concept are not only monolithic in structure, but are specifically configured to provide variated density profiles within their monolithic structures. As used herein, the term "density profile" is used to describe a relative hardness of a cushioned portion of the cartridge assembly relative to another like component part. Thus, the cartridge assemblies of the present concept include density profiles that vary from one another to provide variated comfort settings for a seat assembly. A density profile takes into account a degree of deflection of a part under a given force and can be expressed as a softness, or more likely, a hardness of the part.

With further reference to FIG. 6, the cushioned portion 44 of the first cartridge assembly 40 includes a first lattice matrix 90. The first lattice matrix 90 includes a first pattern 92 of interconnected links 94, wherein the interconnected links 94 cooperate to define cells 96. In the embodiment shown in FIG. 6, the first pattern 92 of interconnected links 94 is shown in a general crisscrossing lattice configuration to provide substantially diamond-shaped cells 96. Other patterns for the first lattice matrix 90 are also contemplated for use with the present concept, which may result in cells of a different size and shape than the cells 96 shown in FIG. 6. The cells 96 generally define voids within the first lattice matrix 90 as defined by the pattern 92 of interconnected links 94, and allow the first lattice matrix 90 to deform under pressure from a seated vehicle occupant.

With reference to FIG. 5, the second cartridge assembly 42 includes a second lattice matrix 100 which defines the cushioned portion 54 of the second cartridge assembly 42. The second lattice matrix 100 of the second cartridge assembly 42 includes a second pattern 102 of interconnected links 104, wherein the interconnected links 104 cooperate to define a second set of cells 106. As illustrated in FIG. 5, the cells 106 of the second lattice matrix 100 of the second cartridge assembly 42 are smaller than the cells 96 of the first lattice matrix 90 of the first cartridge assembly 40. In this way, the second pattern 102 of interconnected links 104 of the second cartridge assembly 42 defines a tighter knit pattern as compared to the first pattern 92 of interconnected links 94 of the first cartridge assembly 40. In this way, the first lattice matrix 90 of the first cartridge assembly 40 is contemplated to have a first density profile defined by the first pattern 92 of interconnected links 94 and cells 96 that is less than a second density profile defined by the second pattern 102 of interconnected links 104 and cells 106 of the second cartridge assembly 42. As shown in FIG. 5, the cells 96 of the first cartridge assembly 40 are larger than the cells 106 of the second cartridge assembly 42. The interconnected links 94 and 104 of the first and second patterns 92, 102 may be comprised of a common material that is flexibly resilient. In this way, the interconnected links 94 and 104 of the first and second patterns 92, 102 can deform or deflect into the respective cells 96, 106 of the first and second cartridge assemblies 40, 42 under an applied force. As such, larger cells can provide more room for deflection of the interconnected links to reduce the hardness of a pattern of interconnected links. Thus, the second lattice matrix 100 of the second cartridge assembly 42 includes a density profile that is greater than a density profile of the first lattice matrix 90 of the first cartridge assembly 42. The stiffness and thickness of the interconnected links 94, 104 may also vary to alter the density profiles of the lattice matrices 90, 100.

With further reference to FIG. 5, the third cartridge assembly 48 includes a third lattice matrix 110 which defines the cushioned portion 57 of the third cartridge assembly 48. The third lattice matrix 110 of the third cartridge assembly 48 includes a third pattern 112 of interconnected links 114, wherein the interconnected links 114 cooperate to define a third set of cells 116. As illustrated in FIG. 5, the cells 116 of the third lattice matrix 110 of the third cartridge assembly 48 are smaller than the cells 96 of the first lattice matrix 90 of the first cartridge assembly 40, and are smaller than the cells 106 of the second lattice matrix 100 of the second cartridge assembly 42. In this way, the cushioned portion 57 of the third cartridge assembly 48 provides a density profile that is higher than the density profiles associated with the cushioned portions 44, 54 of the first and second cartridge assemblies 40, 42. The density profiles of the first, second and third cartridge assemblies 40, 42 and 48 provide the comfort setting for the seat assembly (FIG. 2) when the first, second or third cartridge assembly 40, 42 or 48 are positioned in the forward-most position on the rack assembly 50 at rack 60. With the cushioned portions 44, 54 and 57 described above, the third cartridge assembly 48 provides for a stiffer comfort setting for the seat assembly 10 when the third cartridge assembly 48 is in the forward-most position on the rack assembly 50 at rack 60, while the first cartridge assembly 40 provides for a softer comfort setting for the seat assembly when the first cartridge assembly 40 is in the forward-most position on the rack assembly 50 at rack 60. The second cartridge assembly 42 provides for an intermediate density profile that falls between the density profiles of the first and third cartridge assemblies 40, 48, thereby providing an intermediate comfort setting for the seat assembly 10.

Figure 7:
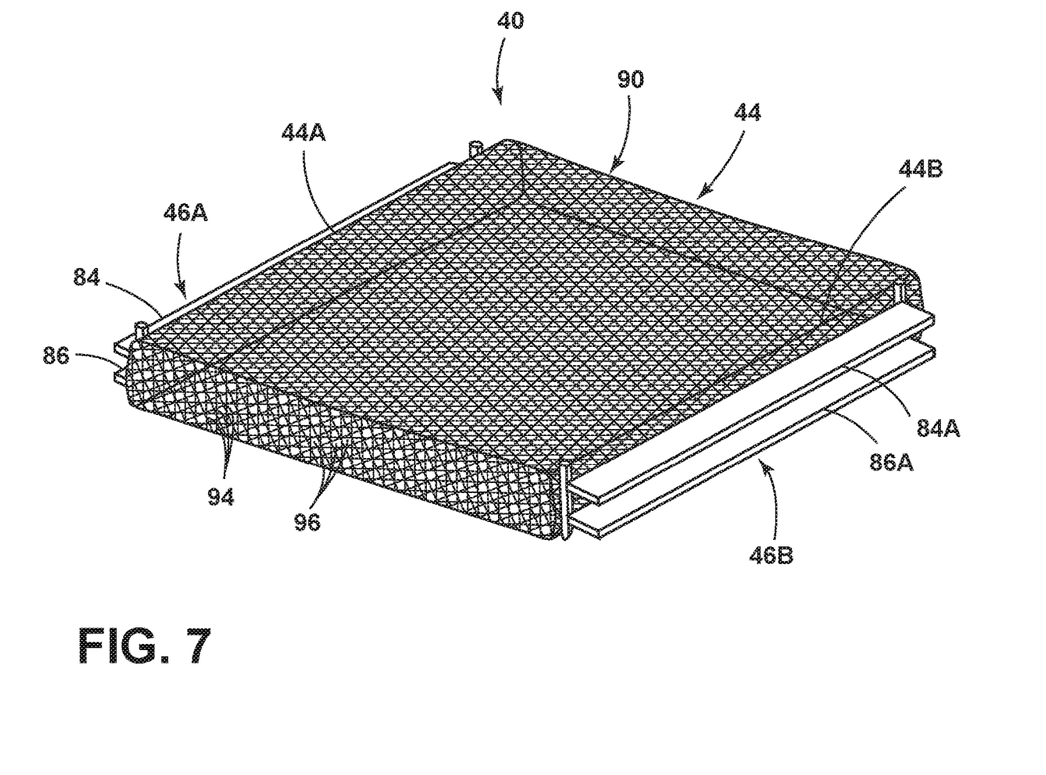
FIG. 7 is a top perspective view of a monolithic cartridge assembly having a lattice matrix.

Referring now to FIG. 7, an embodiment of the first cartridge assembly 40 is shown. The cushioned portion 44 of the first cartridge assembly 40 includes the first lattice matrix 90, and further includes first and second opposed sides 44A, 44B. Along the first opposed sides 44A, the outwardly extending rails 84, 86 are shown. Along the second opposed side 44B, a second set of outwardly extending rails 84A, 86A are shown. In this way, the first cartridge assembly 40, much like the other cartridge assemblies 42, 48, includes outwardly extending rails (84, 86 and 84A, 86A) disposed on opposite sides 44A, 44B of the cushioned portion 44. As such, the first cartridge assembly 40, much like the other cartridge assemblies 42, 48, can be received on opposed mounting members of a particular rack of the rack assembly 50. It is contemplated that any one cartridge assembly may include more or fewer outwardly extending rails as shown in the embodiment of FIG. 7. It is contemplated that the number of outwardly extending rails provided in a given cartridge assembly will correlate to the number of inwardly opening channels disposed on the associated mounting members of a particular rack of the rack assembly for receiving the same in a slideable manner. As noted above, the first cartridge assembly 100 is contemplated to be comprised of a common material formed in an additive manufacturing process, such that the interconnected links 94 of the first lattice matrix 90 of the cushioned portion 44, the outwardly extending rails 84, 86 and 84A, 86A) and any associated internal frame parts are all contemplated to be integrally formed using and additive manufacturing technique to define an overall monolithic structure for the first cartridge assembly 40. Again, the second and third cartridge assemblies 42, 48 are contemplated to be similarly formed using and additive manufacturing techniques to define overall monolithic structures as well. The monolithic cartridge assemblies may be created using a layer-by-layer manufacturing technique, such as 3D printing.

According to one aspect of the present invention, a seat assembly includes a cushioned component having an interior cavity. A rack assembly is positioned within the interior cavity. The rack assembly includes a plurality of racks disposed therein. Each rack of the plurality of racks includes opposed first and second mounting members spaced-apart from one another to define a receiving area therebetween. A plurality of cartridge assemblies are removeably received on the rack assembly. Each cartridge assembly of the plurality of cartridge assemblies includes a cushioned portion including first and second attachment interfaces disposed on opposite sides of the cushioned portion. The first and second attachment interfaces of each cartridge assembly of the plurality of cartridge assemblies are slideably received in a corresponding rack of the plurality of racks of the rack assembly along the opposed first and second mounting members.

Embodiments of the first aspect of the invention can include any one or a combination of the following features:
  the first and second attachment interfaces of each cartridge assembly of the plurality of cartridge assemblies include one or more rails outwardly extending from the opposite sides of the cushioned portion;
  the first and second mounting members of each rack of the plurality of racks include one or more channels inwardly opening towards the receiving area;
  the one or more rails are slideably received in the one or more channels;
  the cushioned portion of each cartridge assembly of the plurality of cartridge assemblies includes a lattice matrix having a density profile;

the cushioned portion of each cartridge assembly of the plurality of cartridge assemblies includes a lattice matrix of interconnected links having a density profile;

the cushioned portion and the first and second attachment interfaces are comprised of a common material to define a monolithic structure;

the cushioned component includes a cover surrounding the interior cavity; and the cover includes an articulating flap that removeably covers an open top portion of the cushioned component to selectively provide access to the interior cavity.

According to another aspect of the present invention, a seat assembly includes a cushioned component with an interior cavity. A rack assembly is positioned within the interior cavity. The rack assembly includes first and second mounting members spaced-apart from one another to define a receiving area therebetween. A cartridge assembly includes first and second attachment interfaces spaced-apart from one another and interconnected by a cushioned portion. The cartridge assembly is removeably received within the receiving area.

Embodiments of the second aspect of the invention can include any one or a combination of the following features:

the first and second mounting members each include one or more channels disposed therealong;

the one or more channels of the first and second mounting members each open inwardly towards the receiving area;

the first and second attachment interfaces of the cartridge assembly each include one or more outwardly extending rails;

the first and second attachment interfaces of the cartridge assembly are slideably received within the one or more channels of the first and second mounting members of the rack assembly, respectively; and the rack assembly includes first and second frame members having the first and second mounting members respectively mounted thereto.

According to yet another aspect of the present invention, a seat assembly includes a seatback having a cushioned component pivotally coupled to the seatback and operable between deployed and retracted positions. The cushioned component includes an interior cavity. A rack assembly is positioned within the interior cavity and includes a forward-most rack with a first receiving area. The rack assembly further includes a rearward-most rack having a second receiving area. A first cartridge assembly is removeably received in the first receiving area of the rack assembly. A second cartridge assembly is removeably received in the second receiving area of the rack assembly.

Embodiments of the third aspect of the invention can include any one or a combination of the following features:

the first cartridge assembly includes a cushioned portion having a first density profile, and further wherein the second cartridge assembly includes a cushioned portion having a second density profile that is different than the first density profile;

at least one intermediate rack assembly disposed on the rack assembly between the forward-most rack and the rearward-most rack and having a receiving area;

a third cartridge assembly having a cushioned portion with a second density profile that is different than the first density profile of the first cartridge assembly and different than the second density profile of the second cartridge assembly, wherein the third cartridge assembly is removeably received in the receiving area of the at least one intermediate rack assembly; and the first and second cartridge assemblies each include first and second attachment interfaces spaced-apart from one another, and further wherein the forward-most rack and the rearward-most rack each include opposed mounting members in which the respective first and second attachment interfaces of the first and second cartridge assemblies are slideably received.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
a cushioned component having an interior cavity;
a rack assembly positioned within the interior cavity, wherein the rack assembly includes a plurality of racks disposed therein, and further wherein each rack of the plurality of racks includes opposed first and second mounting members spaced-apart from one another to define a receiving area therebetween; and
a plurality of cartridge assemblies removeably received on the rack assembly, wherein each cartridge assembly of the plurality of cartridge assemblies includes a cushioned portion having first and second attachment interfaces disposed on opposite sides of the cushioned portion, and further wherein the first and second attachment interfaces of each cartridge assembly of the plurality of cartridge assemblies are slideably received in a corresponding rack of the plurality of racks of the rack assembly along the opposed first and second mounting members.

2. The seat assembly of claim 1, wherein the first and second attachment interfaces of each cartridge assembly of the plurality of cartridge assemblies include one or more rails outwardly extending from the opposite sides of the cushioned portion.

3. The seat assembly of claim 2, wherein the opposed first and second mounting members of each rack of the plurality of racks include one or more channels inwardly opening towards the receiving area.

4. The seat assembly of claim 3, wherein the one or more rails are slideably received in the one or more channels.

5. The seat assembly of claim 1, wherein the cushioned portion of each cartridge assembly of the plurality of cartridge assemblies includes a lattice matrix having a density profile.

6. The seat assembly of claim 5, wherein the cushioned portion of each cartridge assembly of the plurality of cartridge assemblies includes a lattice matrix of interconnected links having a density profile.

7. The seat assembly of claim 6, wherein the cushioned portion and the first and second attachment interfaces are comprised of a common material to define a monolithic structure.

8. The seat assembly of claim 1, wherein the cushioned component includes a cover surrounding the interior cavity.

9. The seat assembly of claim 8, wherein the cover includes an articulating flap that removeably covers an open top portion of the cushioned component to selectively provide access to the interior cavity.

10. A seat assembly, comprising:
a cushioned component having an interior cavity;
a rack assembly positioned within the interior cavity, wherein the rack assembly includes first and second mounting members spaced-apart from one another to define a receiving area therebetween, and further wherein the first and second mounting members each include first and second channels disposed therealong that open inwardly towards the receiving area; and a cartridge assembly having first and second attachment interfaces spaced-apart from one another and interconnected by a cushioned portion, wherein the first and second attachment interfaces each include first and second rails spaced apart from one another and slideably received within the first and second channels of the first and second mounting members, respectively, and further wherein the cartridge assembly is removeably received within the receiving area.

11. The seat assembly of claim 10, wherein the rack assembly includes first and second frame members having the first and second mounting members respectively mounted thereto.

12. A seat assembly, comprising:
a seatback having a cushioned component pivotally coupled to the seatback and operable between deployed and retracted positions, wherein the cushioned component includes an interior cavity;
a rack assembly positioned within the interior cavity and having a forward-most rack with a first receiving area, and further wherein the rack assembly includes a rearward-most rack having a second receiving area;
a first cartridge assembly removeably received in the first receiving area of the rack assembly; and
a second cartridge assembly removeably received in the second receiving area of the rack assembly.

13. The seat assembly of claim 12, wherein the first cartridge assembly includes a cushioned portion having a first density profile, and further wherein the second cartridge assembly includes a cushioned portion having a second density profile that is different than the first density profile.

14. The seat assembly of claim 13, including:
at least one intermediate rack disposed on the rack assembly between the forward-most rack and the rearward-most rack and having a receiving area.

15. The seat assembly of claim 14, including:
a third cartridge assembly having a cushioned portion with a second density profile that is different than the first density profile of the first cartridge assembly and different than the second density profile of the second cartridge assembly, wherein the third cartridge assembly is removeably received in the receiving area of the at least one intermediate rack.

16. The seat assembly of claim 12, wherein the first and second cartridge assemblies each include first and second attachment interfaces spaced-apart from one another, and further wherein the forward-most rack and the rearward-most rack each include opposed mounting members in which the respective first and second attachment interfaces of the first and second cartridge assemblies are slideably received.

* * * * *